US010997512B2

(12) United States Patent
Novotny et al.

(10) Patent No.: US 10,997,512 B2
(45) Date of Patent: May 4, 2021

(54) INFERRING CUES FOR USE WITH DIGITAL ASSISTANT

(71) Applicant: Microsoft Technology Licensing, LLC, Redmond, WA (US)

(72) Inventors: Margaret Novotny, Greenbrae, CA (US); Jacob Miller, Seattle, WA (US); William Wagner, Seattle, WA (US); Yelisaveta Pesenson, San Francisco, CA (US); Aryn Shelander, Redmond, CA (US); Sheena Stevens, Oakland, CA (US); Claudio Russo, Cambridge (GB); Thore Graepel, Cambridge (GB); Andrew D. Gordon, Cambridge (GB); Christopher E. Miles, Oakland, CA (US)

(73) Assignee: Microsoft Technology Licensing, LLC

( * ) Notice: Subject to any disclaimer, the term of this patent is extended or adjusted under 35 U.S.C. 154(b) by 670 days.

(21) Appl. No.: 14/792,268

(22) Filed: Jul. 6, 2015

(65) Prior Publication Data

US 2016/0350667 A1 Dec. 1, 2016

Related U.S. Application Data

(60) Provisional application No. 62/166,085, filed on May 25, 2015.

(51) Int. Cl.
*G06Q 10/10* (2012.01)
*G06N 5/04* (2006.01)
*G06N 7/00* (2006.01)
*G06N 3/00* (2006.01)

(52) U.S. Cl.
CPC ............ *G06N 5/048* (2013.01); *G06N 3/006* (2013.01); *G06N 5/04* (2013.01); *G06N 7/005* (2013.01)

(58) Field of Classification Search
CPC .... G06Q 10/1053; G06Q 10/101; G09B 7/06; G06N 5/048; G06N 7/005; G06N 7/04; G06N 99/005; G06N 5/04; G06N 7/00; G06N 3/006
See application file for complete search history.

(56) References Cited

U.S. PATENT DOCUMENTS

| 5,934,909 A | 8/1999 | Ho et al. |
| 7,243,105 B2 | 7/2007 | Thint et al. |
| 7,519,529 B1 | 4/2009 | Horvitz |

(Continued)

FOREIGN PATENT DOCUMENTS

| CN | 101329674 A | 12/2008 |
| CN | 101379495 A | 3/2009 |

(Continued)

OTHER PUBLICATIONS

Breese et al. "Modeling Emotional State and Personality for Conversational Agents", AAAI, 1998, pp. 7-13.*

(Continued)

*Primary Examiner* — Li Wu Chang

(57) ABSTRACT

Systems and methods for inferring user traits based on indirect questions. Indirect questions may be generated based on one or more triggers. The answers to the indirect questions provide cues to a system as to whether a user has one or more attributes associated with a trait. This information may be used to personalize a computing device.

20 Claims, 11 Drawing Sheets

(56) References Cited

U.S. PATENT DOCUMENTS

| | | | |
|---|---|---|---|
| 7,526,458 | B2 | 4/2009 | Flinn et al. |
| 7,757,250 | B1* | 7/2010 | Horvitz .................. H04H 60/37 725/14 |
| 8,150,692 | B2* | 4/2012 | Stewart .................. G10L 25/63 704/251 |
| 2008/0294637 | A1 | 11/2008 | Liu |
| 2011/0125783 | A1 | 5/2011 | Whale et al. |
| 2012/0016678 | A1 | 1/2012 | Gruber et al. |
| 2012/0060197 | A1* | 3/2012 | Kitahara ............ H04N 21/4349 725/131 |
| 2012/0078938 | A1 | 3/2012 | Davis et al. |
| 2012/0185458 | A1* | 7/2012 | Liu .................. G06F 17/30241 707/709 |
| 2013/0204813 | A1 | 8/2013 | Master et al. |
| 2014/0122497 | A1 | 5/2014 | Eigner et al. |
| 2014/0156676 | A1 | 6/2014 | Brust et al. |
| 2014/0272821 | A1 | 9/2014 | Pitschel et al. |
| 2014/0379521 | A1 | 12/2014 | Novotny et al. |
| 2016/0061600 | A1* | 3/2016 | Dharawat ............. G06F 1/3231 702/150 |

FOREIGN PATENT DOCUMENTS

| | | |
|---|---|---|
| CN | 101729693 A | 6/2010 |
| CN | 103024521 A | 4/2013 |
| CN | 104158963 A | 11/2014 |
| WO | 2001011455 A2 | 2/2001 |
| WO | 2011063289 A1 | 5/2011 |

OTHER PUBLICATIONS

Briggs et al. "A Hybrid Architectural Approach to Understanding and Appropriately Generating Indirect Speech Acts", AAAI, 2013, pp. 1213-1219.*

Breese et al. "Bayesian Networks for Modeling Emotional State and Personality: Progress Report", AAAI, 1998, pp. 37-42.*

Krulwich, Bruce, "Lifestyle Finder—Intelligent User Profiling Using Large-Scale Demographic Data", In AI Magazine, vol. 18, No. 2, Retrieved on: Mar. 4, 2015, pp. 37-46.

Pena, et al., "Collective Knowledge Ontology User Profiling for Twitter—Automatic User Profiling", In Proceedings of IEEE/WIC/ACM International Conferences on Web Intelligence and Intelligent Agent Technologies, Nov. 17, 2013, pp. 439-444.

Wolowski, et al., "Semantic Web Approach to Content Personalization", In Proceedings of International Conference on Mobile Ubiquitous Computing, Systems, Services and Technologies, Nov. 4, 2007, pp. 109-117.

Wang, et al., "Recommendation-Assisted Personal Web", In Proceedings of IEEE Ninth World Congress on Services, Jun. 28, 2013, pp. 136-140.

Athenikos, et al., "Semantic Analysis and Classification of Medical Questions for a Logic-based Medical Question-Answering System", In Proceedings of IEEE International Conference on Bioinformatics and Biomeidcine Workshops, Nov. 13, 2008, pp. 111-112.

"International Preliminary Report on Patentability Issued in PCT Application No. PCT/US2016/034188", dated Aug. 22, 2017, 7 Pages.

"International Search Report and Written Opinion Issued in PCT Application No. PCT/US2016/034188", dated Sep. 5, 2016, 11 Pages.

Li, et al., "Active Affective State Detection and User Assistance with Dynamic Bayesian Networks", In Proceedings of IEEE Transactions on Systems, Man, and Cybernetics—Part A: Systems and Humans, vol. 35, Issue 1, Jan. 1, 2005, pp. 93-105.

Gordon, et al., "A Model-Learner Pattern for Bayesian Reasoning", In Proceedings of the ACM SIGPLAN Notices, vol. 48, Issue 1, Jan. 1, 2013, pp. 403-416.

PCT Second Written Opinion Issued in PCT Application No. PCT/US2016/034188, dated May 18, 2017, 6 Pages.

"Office Action Issued in European Patent Application No. 16730097.9", dated Apr. 18, 2019, 6 Pages.

"Office Action and Search Report Issued in Chinese Patent Application No. 201680030387.2", dated Aug. 5, 2020, 15 Pages.

* cited by examiner

INFERRING CUES FOR USE WITH DIGITAL ASSISTANT

CROSS-REFERENCE TO RELATED APPLICATIONS

This application claims priority to U.S. Provisional Application No. 62/166,085, filed May 25, 2015, entitled "INFERRING CUES FOR USE WITH DIGITAL ASSISTANT," which application is incorporated herein by reference in its entirety.

BACKGROUND

Users of computing devices often prefer to have personalized experiences with the computing device. For example, customizing a digital assistant, a graphical user interface, and programs to complement a user's tendencies, interests, and needs will often enhance the user's computing experience.

Currently users can manually personalize a computer. For example, a user may install particular applications, customize settings within those applications, alter the layout or appearance of a graphical user interface, set favorites in web pages, and so on.

Manual personalization of computing devices, however, often takes time. A user needs to spend time to understand the various personalization options available and then set-up those options. For example, a user may spend a significant amount of time downloading applications, setting features, organization graphical user layouts, etc. Indeed, it may be the case that a user fails to identify a personalization option that would be useful for the user. Additionally, it may not be easy for a user to personalize a computer, and the user may make mistakes in attempting to personalize the computer. Thus, a user could spend time personalizing a computing device in a less-than useful way. Furthermore, should a user's tastes change, the user may then have to revisit and/or change the personalization options of the computing system.

It is with respect to these and other general considerations that aspects of the technology have been made. Also, although relatively specific problems have been discussed, it should be understood that the embodiments should not be limited to solving the specific problems identified in the background.

SUMMARY

The disclosure generally relates to automatically personalizing a system by inferring traits of a user. Inferring traits of a user may occur through a variety of means. One such mean is through the use of indirect questions.

Aspects of the technology include using a digital assistant to ask a user one or more indirect questions. The answers to these questions may be interpreted to determine the likelihood that a user has a specific attribute related traits, such as a pet owner trait. For example, a user may be asked "do you like to go out to go to parks" to assist a computing device to determine whether a user may be characterized as a dog owner for the pet owner trait.

Further, aspects of the technology including using a variety of statistical models to analyze the answers to indirect questions. Historical data (e.g., data collected from other users or data collected from other sources) may be used to correlate responses to indirect questions. In aspects, these correlations will result in a prediction that a person has a particular attribute associated with the trait. Indeed, multiple answers to indirect questions may be received to make such a prediction, and the prediction will have a confidence level (e.g., a computing device may determine, based on multiple answers to a variety of indirect questions, that there is a percentage chance a person is in the age bracket of 18-24). In aspects, if the confidence level reaches a predetermined threshold, a user profile is changed to reflect that the user has the attribute associated with the trait. The user profile may then be used by other programs to personalize the computing experience based on the attribute.

In aspects, users may allow or elect to have a computing system infer traits. The user of a computing system may do this to facilitate personalization of the computing system. For example, a user may respond "yes" to a computer system asking "do you mind if I ask you questions to get to know you better and help personalize your computer?" The user may then be informed that the computing system will store the information. A user may then elect to have the information stored for a specific period of time, such as a month or a year. In aspects, the user may elect to share the information to third parties. In other aspects, the user directs the computing system to keep all information obtained private or to use information only for specific purposes. Additionally, aspects of the technology allow for the user to direct the computer to delete all inferred information.

BRIEF DESCRIPTION OF THE DRAWINGS

Non-limiting and non-exhaustive examples are described with reference to the following Figures.

DETAILED DESCRIPTION

Figure 1:
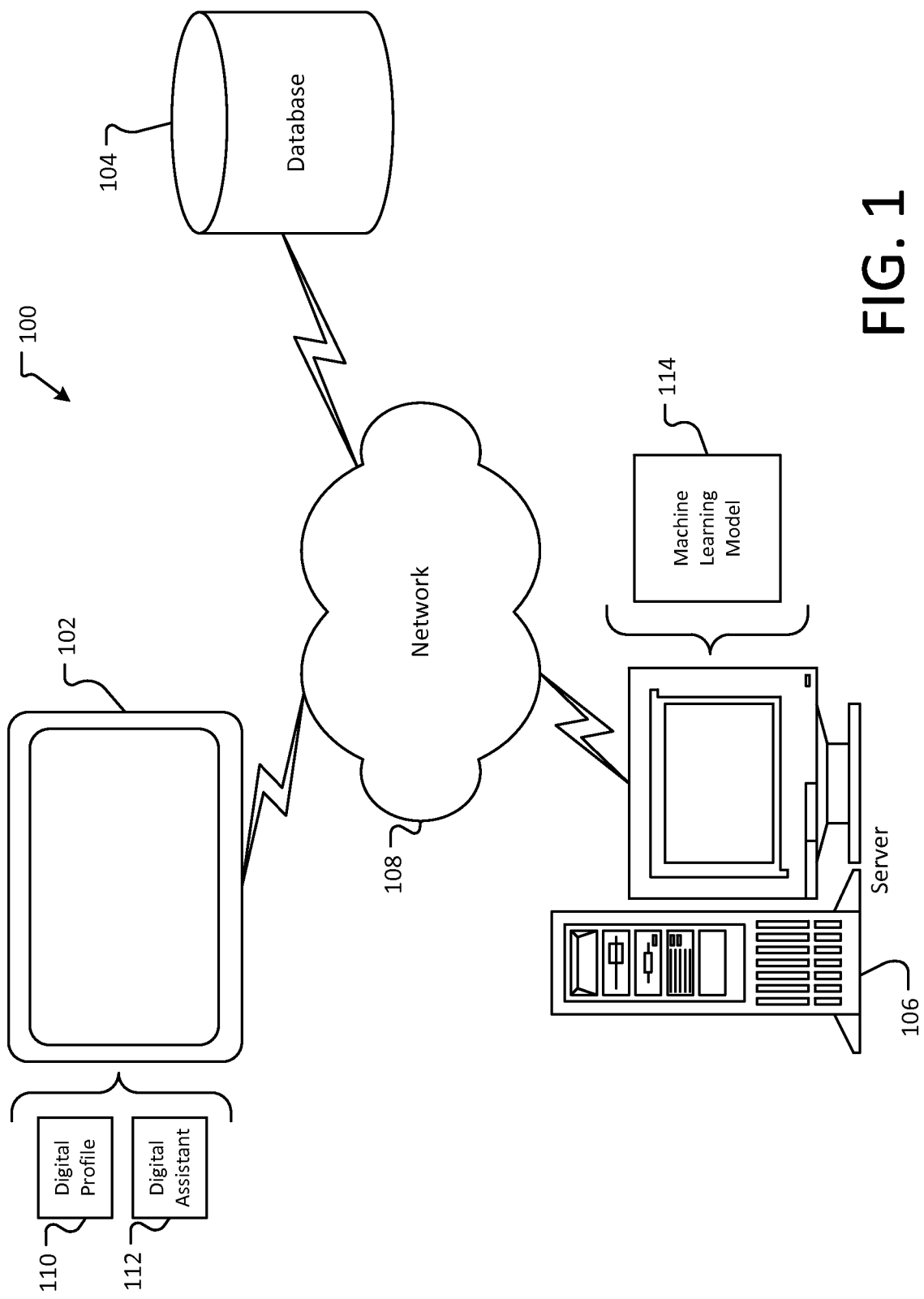
FIG. 1 illustrates a networked-computing environment for inferring and using user traits.

Aspects of the current technology relate to systems, methods, and memory operable to infer cues regarding user traits. These cues may be used to identify probable traits the user has, which traits may then be used by a computer system to personalize the user interaction with one or more computing systems.

Traits are definable categories relating to users. For example, a computing system may have stored the defined traits of: pet owner, vehicle preference, sports fan, personality type, skier, etc.

Traits may be populated with trait information related to the user. For example, the trait "pet owner" may be populated with the trait information "cat owner, dog owner, and/or fish owner." Thus, if a computer system identifies that a user is a dog owner, the computer system may populate the trait pet owner with the trait information "dog owner." Other traits include home owner and age, etc.

Trait information may be used to personalize a user's computing experience. For example, data stored in a database may house information that suggests that users having a particular trait (i.e., having a trait populated with specific trait information) are more likely to find certain interactions with a computing device useful than other interactions. In aspects, the historical data may indicate that an exemplary user who is a dog owner, does not own a car, and is an extrovert is likely to appreciate greater access to dog websites than another exemplary user who is not a dog owner, owns a car, and an introvert. Thus, an exemplary system that has identified that a user is a dog owner, does not own a car, and an extrovert may use that identification to customize the system to provide easier access to dog websites for meet ups with other dog owners. This may occur, for example, by automatically setting up a graphical user interface to allow quick access to a popular dog website, setting a digital assistant to resolve ambiguous requests regarding animals in favor of providing information and services related to dog websites, and/or setting a home page for a web browser to a popular dog URL. Additionally, other program applications may use the information. For example, where a user has been identified as a dog owner, a map application may highlight dog friendly hotels and/or dog parks.

Additionally, aspects of the technology include identifying trait information of a user. In an embodiment, this may be performed by inferring the trait information based on answers to indirect questions. An indirect question is a question where the elicited response implies trait information, but does not directly identify the trait information. For example, if the trait is whether or not someone is an extrovert, a direct question would be "Are you an extrovert?" An indirect question could be "Do you feel energized when being around other people?" (assuming that the answer to the question reveals some information about whether or not the user is an extrovert).

Further, an indirect question may be defined in terms of the trait that is being identified. That is, it maybe indirect for one trait and direct for another trait. For example, a computing device may have two traits it uses to personalize interaction with a user: age and home owner. In this situation, the question "how old are you" would be a direct question with respect to the age trait and would be an indirect question with respect to homeowner status. For example, if the user answered "15," that answer would likely be positively correlated with not owning a home. Thus, the question "how old are you" may be an indirect question with respect to homeowner status.

Additionally, answers to indirect questions may not necessarily have an obvious correlation to trait information. Further, the answers need not be causally linked to the trait. For example, a database may have data suggesting that an affirmative answer to the question "Do you like to fish?" positively correlates to a user likely having a home. However, the correlation does not necessarily mean that liking to fish causes one to have a home.

In some instances, asking an indirect question may be helpful in getting a user to answer the question. For example, a user may feel more comfortable discussing the fact that they like going out at night as opposed to self-identifying as being an extrovert.

FIG. 1 illustrates a networked-computing environment 100 for inferring and using user traits. As illustrated, FIG. 1 includes a computing device 102, a networked-database 104, and a server 106, each of which is communicatively coupled to each other via a network 108.

The computing device 102 may be any suitable type of computing device. For example, the computing device 102 may be one of a desktop computer, a laptop computer, a tablet, a mobile telephone, a smart phone, a wearable computing device, or the like. Additionally, aspects of the current technology include the computing device storing a digital profile 110 and storing a digital assistant 112.

The digital profile 110 is a set of information about a user. Accordingly, multiple digital profiles 110 may be stored on the computing device 102, where each digital profile 110 corresponds to a particular user. Aspects of the technology include the digital profile 110 having trait information regarding a user for one or more traits. For example, the digital profile 110 may include the trait information of a user for one or more traits of a user, including home ownership, pet ownership, age demographic, etc.

In aspects, the user controls the availability of the information stored in the digital profile 110. For example, a user may determine which applications on the computing device 102 have access to the digital profile 110. Additionally, aspects of the technology allow the user to opt out of having a digital profile 110 altogether.

Aspects of the technology include a digital assistant 112 being located on a computing device 102. The digital assistant 112 may receive input from a user, interpret the input, and take appropriate action. For example, the digital assistant 112 may respond to requests or questions from a user of a computing device 102. Such requests or questions may be entered into the computing device 102 in a variety of ways including text, voice, gesture, and/or touch. The digital assistant 112 may interpret the input and respond accordingly. As a specific example, a user may query the digital assistant 112 using the voice command "are there any parks around." The digital assistant 112 may interpret the question and respond accordingly.

For example, a user may have granted access to the digital assistant to access the digital profile 110. The digital profile 110 may include trait information that indicates the user is a runner and owns a dog. Using this information, the digital assistant 112 may then personalize the response by either providing both dog parks and running parks, or by asking follow-up questions such as "Are you looking for a place to run?" or "Are you looking for a park that's dog-friendly?")

The digital assistant 112 may use trait information of a user stored in the digital profile 110 to aid in personalizing responses to requests and questions. For example, aspects of the technology include populating trait information of a user to indicate the user has a pet. Continuing with the example above where the digital assistant 112 has identified that the user has dog, the digital assistant 112 may respond by listing dog parks and separately listing regular parks.

Further, aspects of the technology include using a digital assistant 112 to infer trait information about a user through queries to the user. For example, the digital assistant 110 may ask "what do you like to do at night" when a user first interacts with the digital assistant or at other times. Alternatively, the digital assistant 112 may ask a question in response to an initial query. For example, if a user asks "are there any concerts playing" the digital assistant may be triggered to ask "do you often like to go to concerts?" This question may be in an attempt to identify whether a person is extroverted for a personality trait. The ways in which a digital assistant may be triggered to ask a question (either direct or indirect) are additionally explained with reference to FIG. 5. The answers to a digital assistant's 112 queries may be used to infer one or more traits of a user. For example, the answers to the queries may be sent via a network 108 for processing by a machine learning model stored on the server 106.

As illustrated, the server 106 houses the machine learning model 114. The machine learning model 114 receives information regarding a user, such as information from an indirect question asked by a digital assistant 112. For example, in response to the question "do you often like to watch television at night" a user may have responded "yes." The response may be received at computing device 102 by a digital assistant 112. The response may then be sent over a network 108 to the server 106 to be processed by the machine learning model 114.

Processing of information regarding a user by machine learning model 114 includes a machine learning model 114 processing responses to indirect questions to determine whether trait information may be inferred from the response. For example, a machine learning module 114 may have access to information that associates responses to indirect questions with user traits and user trait information. Indeed, the machine learning model 114 may use statistical modeling to make a prediction as to whether a trait may be populated with specific trait information based on a user's response to an indirect query.

For example, machine learning model 114 may use a variety of techniques to determine that a user that responds "often goes to parties," "likes speaking at events," and "enjoys networking" is probably a user that has the trait of being extroverted. One such technique is accessing data stored in database, such as database 104, to determine that most people that self-identify as "often going to parties," "liking to speak at events," and "enjoying networking" may be appropriately categorized as being an extrovert. This data may be obtained based on prior experimental evidence (such as, for example, a survey that had been gathered and the results stored in a database). In aspects, after the machine learning model 114 makes a prediction regarding a user trait with a sufficiently high confidence level, the trait information may be sent to the digital profile 110.

The machine learning model 114 may dynamically determine the likelihood a user has a particular trait. For example, and following the example above, the machine learning model 114 may have determined a likelihood (e.g., a numerical probability) that a user is an extrovert. If the machine learning module 114 receives a further response that indicates a user "enjoys staying in" the machine learning model 114 may determine that there is a less likelihood that the user has a personality trait of being an introvert. Based on such determinations, the machine learning model 114 may alter or remove pervious determinations regarding trait information. This may occur by sending the new trait information (or instructions to remove the trait information) to the computing device 102 housing the digital profile 110.

System 100 may also have a database 104. The database 104 may be used to store a variety of information including copies of user profiles, answers to past indirect questions, other responses, etc. Additionally and as previously discussed, the database 104 may store data that associates a user's responses with trait information.

Network 108 facilitates communication between devices, such as computing device 102, database 104, server and 106. The network 108 may include the Internet and/or any other type of local or wide area networks. Communication between devices allows for the exchange of data and files such as answers to indirect questions, digital profiles, and other information.

Figure 2:
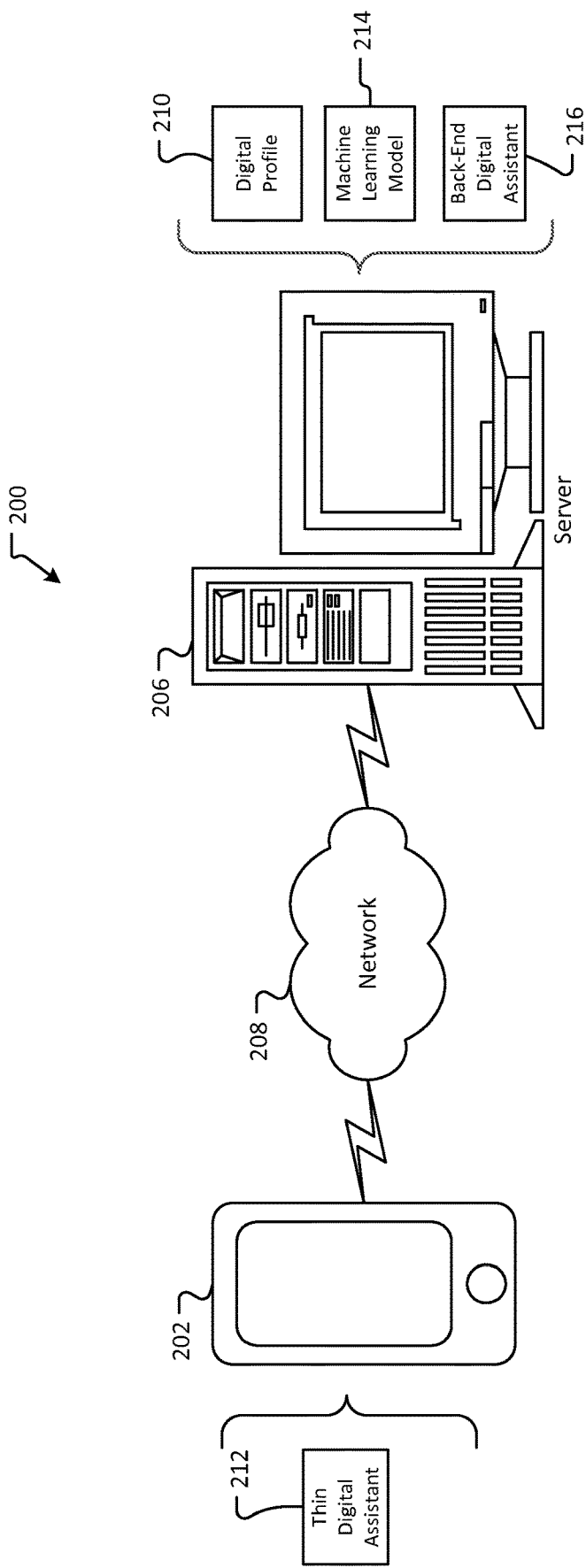
FIG. 2 illustrates an alternative environment for inferring and using user traits.

FIG. 2 illustrates an alternative environment 200 for inferring and using user traits. As illustrated, the networked environment 202 includes a computing device 202 and a server 206, each of which is communicatively coupled to each other via a network 208. It will be appreciated that the elements of FIG. 2 having the same or similar names as those of FIG. 1 have the same or similar properties.

As illustrated, a digital assistant 212 is stored on a computing device 202. The digital assistant 202 may be a thin digital assistant 202, where the thin digital assistant 202 is configured to display audio and visual messages and receive input. The input may be sent via a network 208 to a server 206, and some or all of the processing of received requests is completed by the back end digital assistant 216. Further the back end digital assistant 216 works with the digital assistant 212 with to provide the same or similar user experience as the digital assistant described with reference to FIG. 1.

Additionally, the networked system includes a server 206 housing the digital profile 210 and the machine learning model 214. While FIG. 1 and FIG. 2 illustrate systems in a particular configuration, it will be appreciated that a machine learning model, a digital assistant, and a user profile may be distributed in a computing system in a variety of ways to facilitate inferring user traits.

Figure 3:
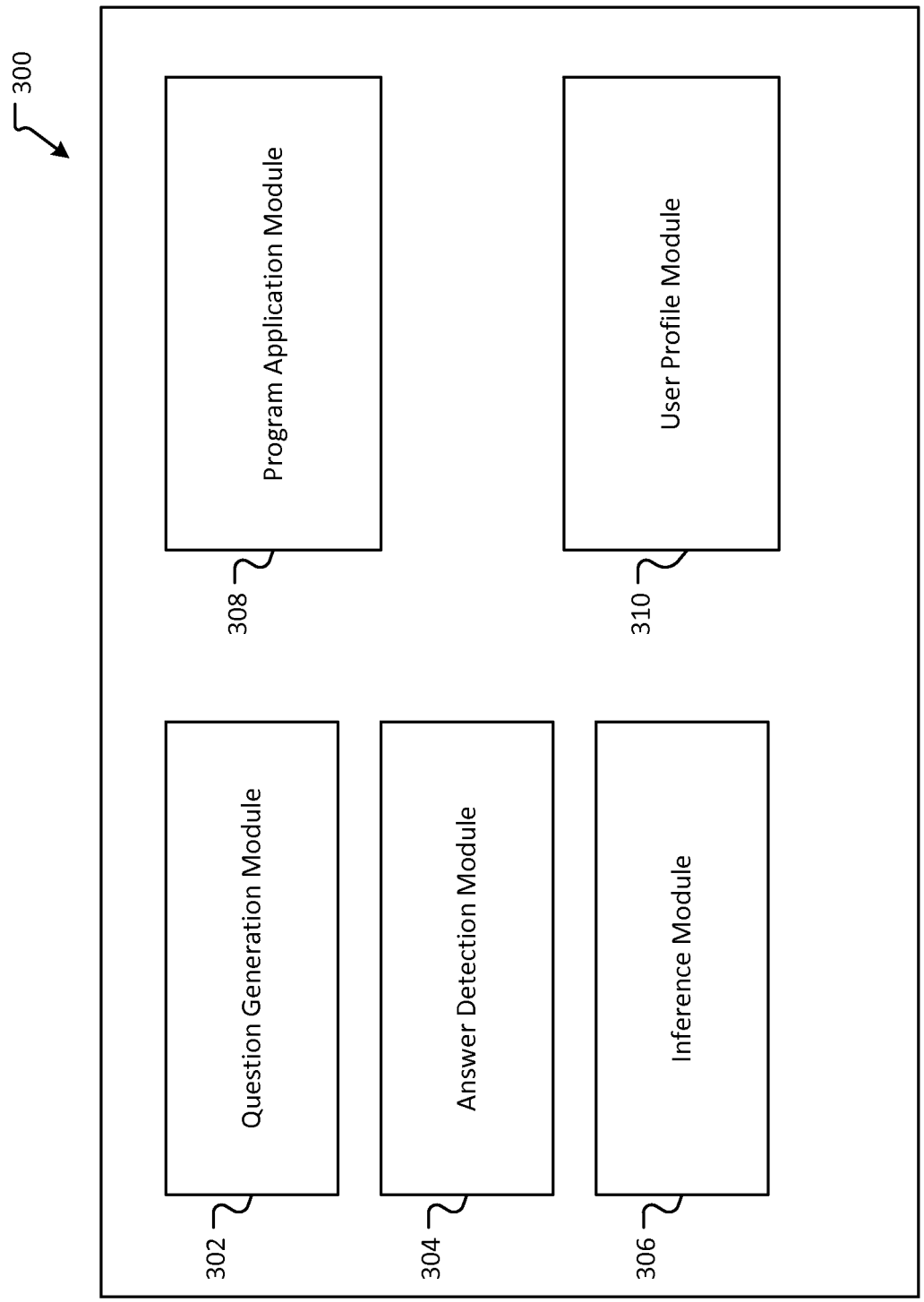
FIG. 3 illustrates a system for inferring traits based on indirect questions.

FIG. 3 illustrates a system 300 for inferring traits based on indirect questions. As illustrated, system 300 includes a question generation module 302, an answer detection module 304, an inference module 306, a user profile module 308, and a program application module 310. It will be appreciated that each of question generation module 302, answer detection module 304, inference module 306, user profile module 308, and program application module 310 may be implemented on a single computing device or across multiple computing devices. Indeed, any single module may be implemented across multiple computing devices.

Aspects of the technology include a question generation module 302 that generates questions, which questions are designed to illicit responses that may be used by a computing system 300 to identify one or more traits of a user. For example, the question generation module 302 may have a set of indirect questions that the question generation module 302 may access (such as, for example, by accessing a database). Alternatively, these questions may be dynamically created using any appropriate technique.

The indirect questions may be designed such that the elicited responses are used to identify trait information of a user for one or more traits. As a specific example, it may be determined (by using experimental evidence, for example) that a user that goes to a public park three or more times in a month is likely to have pets. The question generation module 302 may then generate questions designed to determine how often a user goes to go to a park. Such questions may include "Do you like to go to the park?", "How do you like to spend your free time?", "How often do you go to a park?", "How many times a month do you go a public park?, etc. Certain answers to these questions will indicate that a user goes to a park more than three times a month, such as, for example, "Yes, I go to the park more than three times per month."

The question generation module 302 may ask follow-up questions if the response to the question is insufficient to infer a user trait. The determination of whether the answer is insufficient to infer a user trait may be done by the answer detection module 304. Following the example above, if the user's answer is ambiguous, such as "I like to go to the park," then question generation module 302 may ask "how many times to you go to the park in a month?"

The answer detection module 304 receives answers to the questions generated by the question generation module. Following the example above, the answer detection module 304 may receive the response "I go to the park three or more times per month." The answer detection module 304 will analyze the response to determine whether or not the answer is an answer from which an inference may be drawn. For example, in the above example, the answer detection module 304 may identify that the user has indicated that the user goes to the park three or more times per month. In cases where such information may be used to determine the likelihood of a trait, the answer detection module may pass information to the inference module 306 sufficient for the inference module to make an appropriate inference. In this case, the information that may be passed may be the number of times the user visits the park per month.

The inference module 306 receives the information and then makes inferences based on the received information. For example, the inference module may have stored information indicating that the number of times a user visits the park is positively correlated to a user having a dog (i.e., the trait pet owner may be likely correlated with the trait information dog owner). Indeed, this may be one variable in a list of variables. That is, the inference module may have stored a formula similar or the same as:

$$P(\text{dog}) = a(x) + b(y) + c(z)$$

where P(dog) is the probability that a user has a dog, a is a positive coefficient, x is 1 when a user visits the park more than three times a month. Further b may be a negative coefficient corresponding to a characteristic y that a person does not have a dog (such as for example, the characteristic that the person is allergic to dogs). Additionally, c may be another positive coefficient corresponding to a characteristic z that a person has a dog (such as a non-causal characteristic, for example, how often the person goes to a matinee movie in a given year). These coefficients may be calculated using imperial studies. The probability that the user has a dog may be translated into a confidence score by the inference module. Aspects of the technology include setting a high confidence score when calculated probability is high and/or a large number of inferences on a given trait have been made.

As such, the question generation module 302, the answer detection module 304, and the inference module 306 may work together to formulate a set of questions designed to elicit detectable answers, which answers may be used to confidently identify traits. For example, if the inference module 306 has a stored model with thirty-two attributes that help identify whether a person has a dog, but there is only information on five of those attributes, the inference model may not be able to predict with sufficient accuracy as to whether the user has a dog. Thus, the question generation module may tag the remaining twenty-seven attributes and request the question generation module to generate questions to identify those twenty-seven attributes. The question generation module 302 may then generate questions related to those attributes. The answer detection module 304 would then analyze the responses to the generated questions. In aspects, once the inference module 306 has calculated a sufficiently high confidence score, the inference module 306 sends a notice to the question generation module 302 to stop asking questions relate to the trait.

Further, aspects of the technology include the inference module 306 sending a request to set user trait information to the user profile module 310 when the confidence score meets predetermined threshold. For example it may be determined that when a user has responded to indirect questions indicating that the user likes to go to the park more than three times per month, often goes to matinee movies, and is not allergic to dogs, that the user has a sufficiently high probability of having a dog. In such a case, trait information may be sent to the user profile module 310 in order to populate a user trait (e.g., pet owner status) with the inferred trait information (e.g., has a dog).

Additionally, aspects of the technology include having a user profile module 310 for storing multiple user traits. For example, a user profile may include various traits related to a user. Aspects of the technology allow for the user to tightly manage privacy settings related to traits so that the user is in control of sensitive information. Indeed, aspects of the technology allow for a user to delete all information and to prevent further aggregating of trait information.

One trait that may be housed by user profile module 310 is the trait "typical entertainment consumption style," which may include the following trait information: prefers to consume entertainment alone, with spouse, with children, with family, with friends, etc. Another is the most prevalent content domain trait, which describes a user's content preferences. This can include sports, news, socializing, cooking, travel, finance, etc.

The information stored in user profile module 310 may be made available to a program application module 308. In aspects, the user must grant permission for this information to be stored in the user profile 310. A program application module 308 interfaces with one or more program applications to provide relevant user trait information. A program application may be a web browser, a digital assistant, an operating system, or any other program application for which user trait information may be used to personalize a user experience. The program application module 308 may provide information to a program application when the program application module 308 identifies that a trait is set to a particular trait information value. For example, if the user trait "Most Prevalent Domain" is set to the value of "sports," the program application module 308 may provide the information to the web browser, which may result in the setting of the home page to a popular sports web page. As another example, if the user profile indicates that a user is a pet owner, the program application module 308 may provide this information to a digital assistant. The digital assistant may then use this information in tailoring responses to user queries. Moreover trait information may be used to personalize a graphical user interface. For example, if the trait of information is a pet owner, the background of a graphical user interface may be set to a pet themed background. As another example, where it is identified that a hobby trait has been populated with trait information, such as person is a baseball fan or a skier, various applications may provide use such information. For example, a media application may provide updates to baseball scores and/or snow conditions where the hobby trait has been populated with trait information of baseball fan and skier, respectively.

Figure 4:
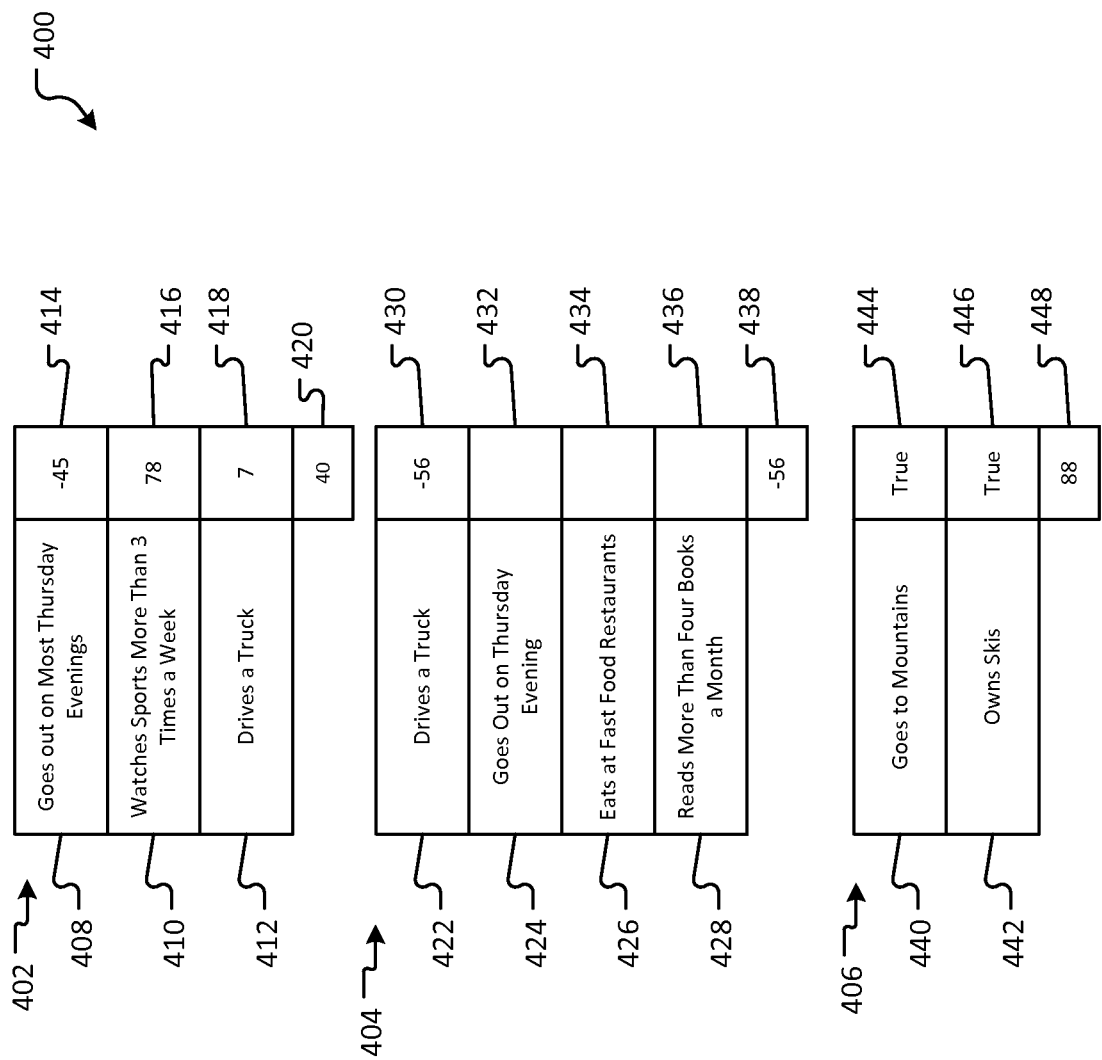
FIG. 4 illustrates an embodiment of a system for calculating confidence scores.

FIG. 4 illustrates an embodiment of a system 400 for inferring trait information. Though FIG. 4 illustrates a pet owner trait 402, a personality type trait 404, and a hobby trait 406, it will be appreciated that numerous other/additional traits may be present in a system, such as system 400.

Aspects of the technology include traits, such as pet owner trait 402, personality type trait 404, and hobby trait 406 having one more one or more inference fields. An inference field is a field that is used to determine whether a user should be assigned particular trait information related to the trait. For example, in pet owner trait 402, the trait information may be has pet or does not have pet. In aspects of the technology, the system 400 will have identified the presence or absence of an inference field in order to determine trait information for a user.

In aspects, the extent to which an inference field determines the likelihood that a user should be assigned particular trait information may be made by an inference score. In some systems, an inference score may range between −100 and +100, with a score of −100 indicating that a user absolutely should not be assigned particular trait information, and a +100 indicating that user absolutely should be assigned particular trait information. In such a system, a score of 0 would indicate that no information is available regarding the inference. In aspects, a total inference score (that is, the total of all inference scores for a particular trait) will have a range of −100 to +100 in aspects of the technology. It will be appreciated that scores associated with inference fields will be calculated using previously collected data, such as from an imperial study or other sources.

As illustrated, pet owner trait 402 has three inferences fields including a "Goes out on most Thursday Evenings" inference field 408, a "Watches Sports more than 3 times a week" inference field 410, and a "Drives a Truck" inference field 412. As illustrated a first inference score 414 associated with "Goes out on Thursday Evenings" is −45, a second inference score 416 associated with the "Watches Sports" inference field 410 is 78, and a third inference score 418 associated with the "Drives a Truck" 412 has a value of 7. The total of each of these inference scores is illustrated a total pet owner inference trait score 420, which has a value of +40. In aspects, a positive score may indicate that the person is likely to have a pet, and thus the user is assigned the "is a pet owner" information for the pet owner trait.

Whether an inference field has an inference score may be determined by an indirect question. For example, the "Drives a Truck" inference field 412 may be determined by a digital assistant by asking a user "do you drive a truck," "what type of vehicle do you drive," and/or "what is the make and model of your vehicle." The response from the user (received by the digital assistant or other means) may determine whether to set an inference score, such as third inference score 418. Thus, if it is determined that the user drives a truck, then the third inference score 418 is set to a value.

Aspects of the technology include identifying inference fields by asking direct questions (such as do you drive a truck). As illustrated, this would be an indirect question related to the pet owner type trait 402. In aspects, the inference field may also be determined by one or more indirect questions (such as do you like monster trucks), and assigning a confidence score to each inference field. Thus, inference fields may be determined in a similar way as trait information is determined.

Aspects of the technology include setting the value of an inference score based on historical and/or experimental data. For example, if it is known that pet owners only drive trucks and trucks are only driven by pet owners, then the "Drives a Truck" inference field 412 will have a third inference value 418 set to 100 when it is known that user drives a truck (where a positive value indicates the user has the person is a pet owner and a negative value indicates that a user is not a pet owner). As illustrated, the third inference value 418 is set to +7, indicating a mild correlation between driving a truck and being a pet owner.

When a trait has a total inference score, the trait information may be set and passed to a user profile. For example, the pet owner trait 402 has a total pet owner inference trait score 420 of 40. Thus, in aspects where a positive number indicates that a user is a pet owner, the user profile pet owner trait may be populated with the trait information of being a pet owner.

In some aspects, the total inference score is first evaluated as to whether it meets a threshold value. For example, the pet owner field may require the total pet owner inference trait score 420 to be above a threshold value of 80 to assign a user profile as a pet owner, and be below a threshold value of −70 to assign a user profile as not pet owner.

The same information may be used by a variety of traits to derive inferences. For example, the information regarding whether a person drives a trucks is used both by the pet owner trait 402 and personality type trait 404. The personality type trait 404 has a second "Drives a truck" inference field 422 with a fourth inference value of −56. In embodiments, the − value of the fourth inference value −56 indicates that the person is likely not an introvert. Other inference fields such as "Goes out on Thursday evening," "Eats at Fast Food Restaurants," and Reads more than four books a month" may have no values populated in a fifth inference score 432, a sixth inference score 434, and a seventh inference score 436, respectfully. Thus the personality type trait total score may be −56.

The calculation of a total inference score need not be based on addition of inference scores of the one or more inference fields of a trait. Rather, the inference score may be calculated using other mathematical functions. For example, the hobby trait 406 has two inference fields including a "goes to mountains" inference field 440 and an "owns skis" inference field 442 The eighth inference field score 444 and the ninth inference field score 446 store binary true/false information. Based on these inference field score, system 400 may determine a total inference 448 using an underlying mathematical function that uses the binary information to produce a hobby trait total score 448. That score may indicate that the person has a skiing hobby.

Confidence scores may be calculated in a non-linear fashion such that slight variations in inference fields may cause drastic changes in the confidence score assigned to the identified trait. For example, responses direct questions identify that a user likes to play golf, is recently married, has no kids, and lives in an urban area. Using this information, a machine learning model may determine through an indirect analysis that the person is likely an extrovert. However, new information indicating that the person intends to move to a suburban area (thus changing the assigned inference from city dweller to suburban dweller) may cause the system 400 to determine that the person is likely an introvert.

Moreover, the score (or weight) any given trait has on determining whether a person has a particular attribute related to a trait may shift as more information is received. Other known statistical modeling may be used, such as linear regression, Bayesian models, and the like to determine how and when to make inferences regarding user traits.

Figure 5:
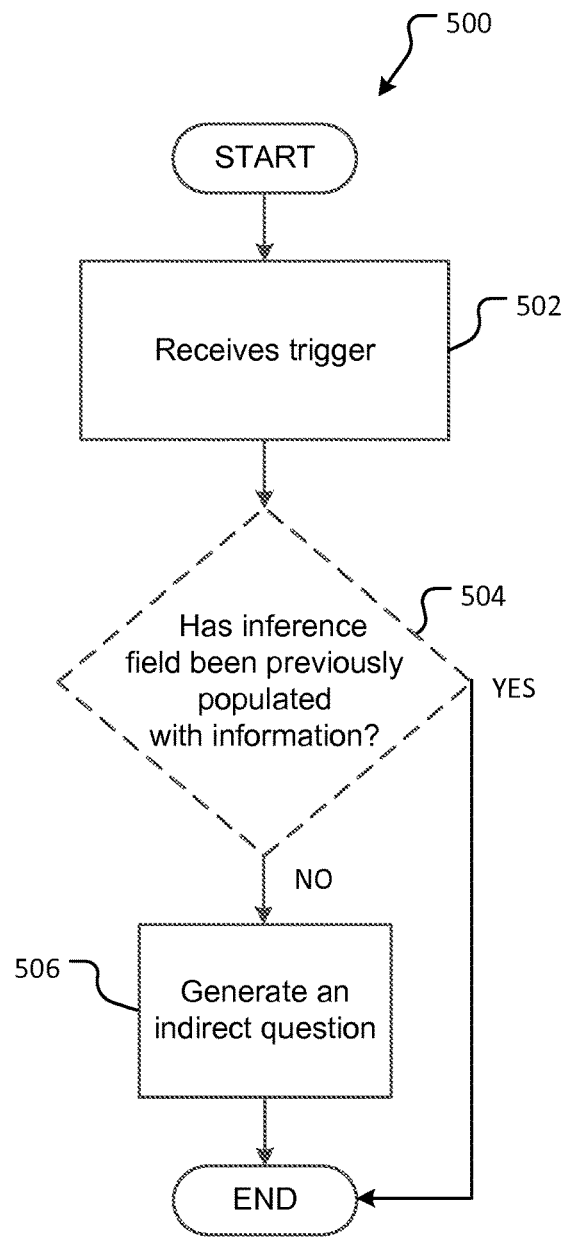
FIG. 5 illustrates a method for asking an indirect question in response to a trigger.

FIG. 5 illustrates a method 500 for asking an indirect question in response to a trigger. As illustrated, method 500 beings with receive trigger operation 502. In operation receive trigger 502, a computing device receives a trigger.

For example, a trigger may occur by a user first starting up a computing device or a user first interacting with a digital assistant. Aspects of the technology include a trigger being a received when a user asks a digital assistant a question related (e.g., in the domain) to an inference or a trait. For example, a user may ask "where is the nearest dance club." The digital assistant may recognize that going to dance clubs is an inference field for the trait of personality type, and this may trigger the digital assistant to ask an indirect question such as "do you often go to dance clubs."

In an optional step of method 500, after a trigger is received, the method proceeds to determination step 504, where it may be determined whether the inference field has been previously populated with information. For example, if it has already been determined that a user often goes to dance clubs, the determination step 504 will determine that the inference field has already been populated and the method 500 will end. If it is determined that the inference filed has not been populated, the method proceeds to generate an indirect question. In other aspects, the determination step 504 is not performed, but rather if a trigger is received then the operation proceeds directly to generate indirect question 506.

In generate an indirect question operation 506, an indirect question designed to illicit a response that will populate the inference field related to the trigger is generated. For example, where the trigger was a question "where are dance clubs," the trait is personality type which may have a value of introvert or extrovert, and the inference field is "does the user enjoy dance clubs," the indirect question as related to the trait may be "do you enjoy dance clubs." This information may be used to infer a variety of traits such as personality type and age traits. After generate indirect question 506, the method ends.

Figure 6:
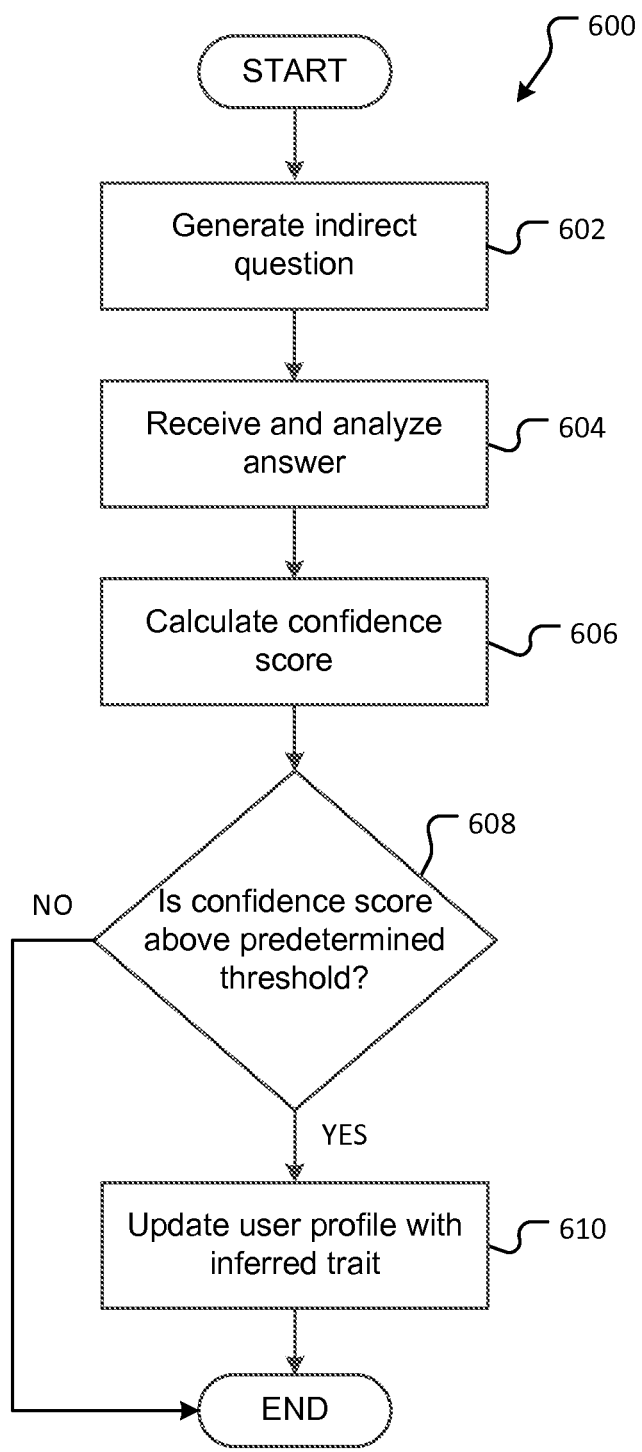
FIG. 6 illustrates a method for inferring user traits based on indirect questions.

FIG. 6 illustrates a method for inferring user traits based on indirect questions. Method 600 begins with generate indirect question operation 602. In method 602, an indirect question is generated. For example, the indirect question may be generated based on a trigger. The indirect question may come from a set of pre-existing questions or may be dynamically generated. In some aspects, the indirect question is presented to the user in a form of a questionnaire or through natural language dialog.

The method 600 then proceeds to receive and analyze answer operation 604. In receive answer operation, the answer to the indirect question is received and analyzed. The received input may be examined to determine whether an inference field may be populated with information. For example, if an inference field is "drives a truck" and a response to the question "do you drive a truck" is "no," then an inference field may be given a score of negative number.

The method 600 then proceeds to calculate confidence score operation 606. In operation 606 a confidence score is calculated for one or more trait information based on the received and analyzed answers. For example, where the inference field is "drives a truck" and the response is negative, such a response may allow for the calculation of high confidence score that the person likely has a dog. Such a calculation may be based on other inferences such as knowing the user likes to go to the park, likes to watch matinees, and lives in a suburban area.

The method then proceeds to determine operation 608, where it is determined whether a confidence score is above a predetermined threshold. If the confidence score is above a predetermined threshold, then the method 600 operations proceeds to update user profile with inferred trait operation 610. If the confidence below a predetermined threshold, the method 600 ends without updating a user profiled trait with trait information.

Figure 7:
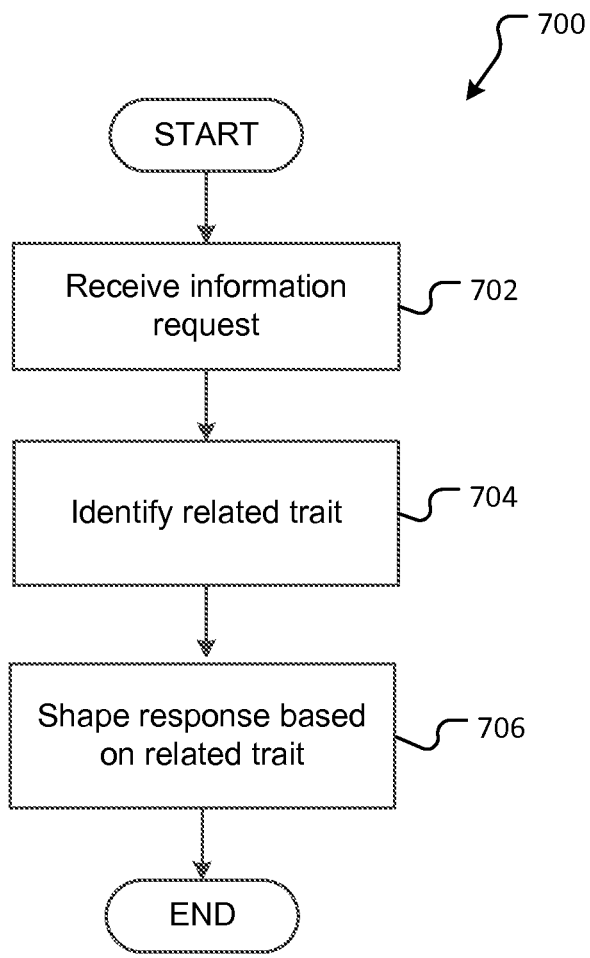
FIG. 7 illustrates a method of digital assistant using an inferred trait to personalize a user experience.

FIG. 7 illustrates a method of digital assistant using an inferred trait to personalize a user experience. The method 700 begins with receive request for information operation 702. In aspects, the digital assistant may receive a question such as "search for things to do tonight." The request may come in a variety of forms such as a voice command, a gesture, a touch, or the like.

The method 700 then proceeds to identify related trait operation 704. In operation 704, it is identified whether a trait with populated information is related to the request. For example, the digital assistant may identify that personality type is related to "search for things to do tonight." The relation may be based on predetermination, where it is determined that web searches for activities should be checked against the traits of personality type.

The method 700 then proceeds to shape response based on related trait 706. For example, if it is determined that a person is characterized as being an extrovert for the personality type trait, then the digital assistant may respond in a manner consistent with such a characterization.

Figure 8:
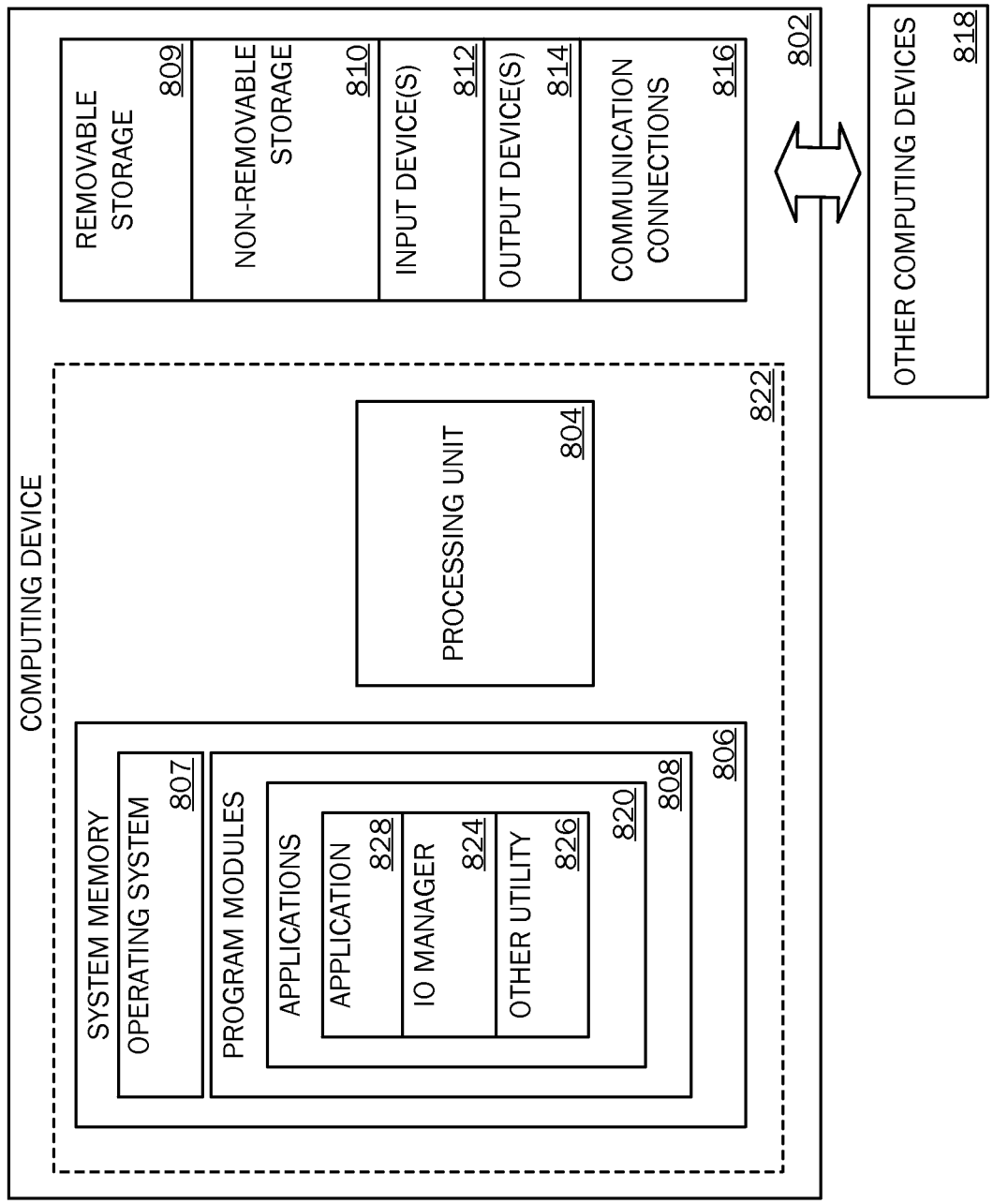
FIG. 8 illustrates an exemplary tablet computing device that may execute one or more aspects disclosed herein.
Figure 9A:
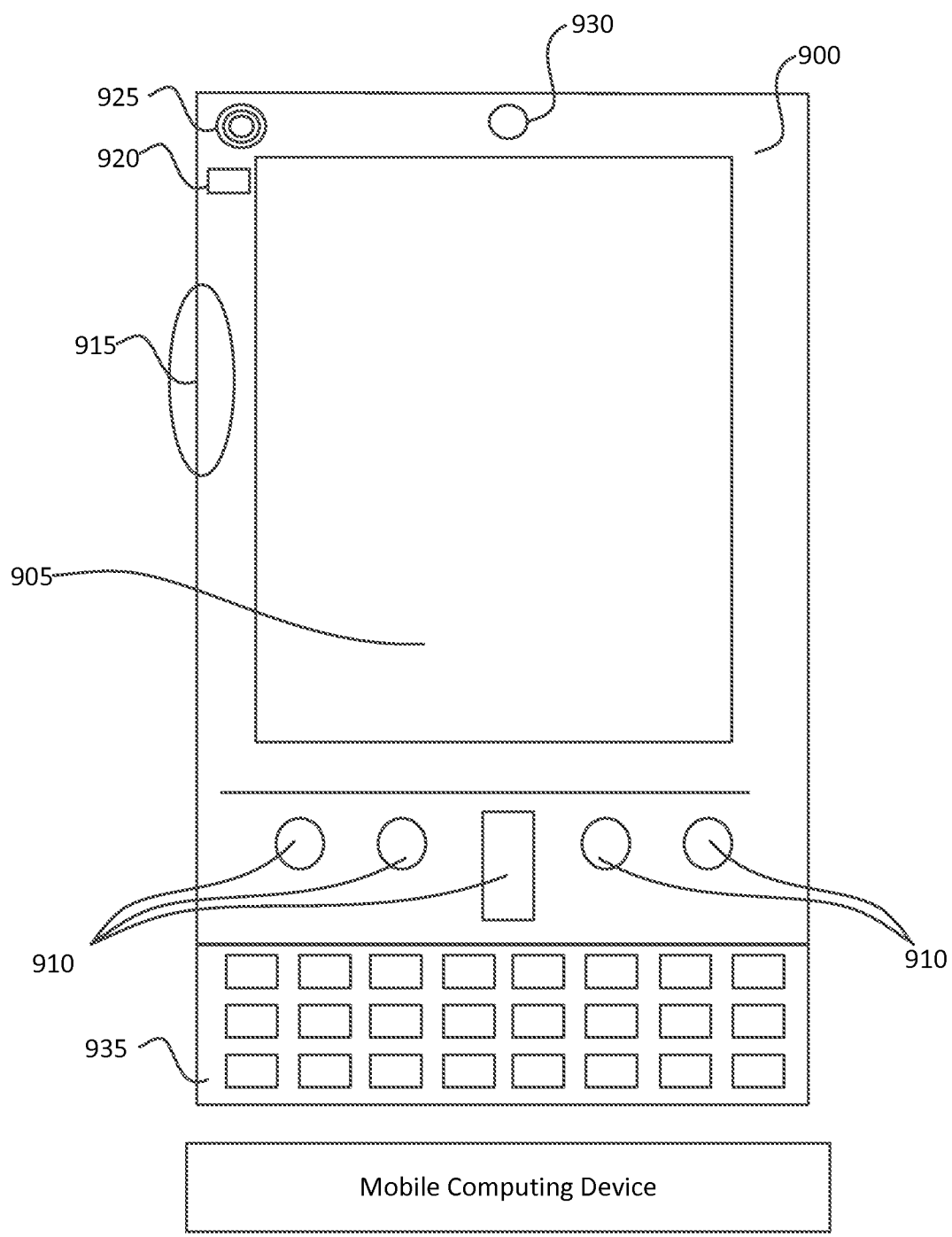
FIGS. 9A and 9B illustrate a mobile computing device 900, for example, a mobile telephone, a smart phone, a personal data assistant, a tablet personal computer, a laptop computer, and the like, with which examples of the invention may be practiced.
Figure 9B:
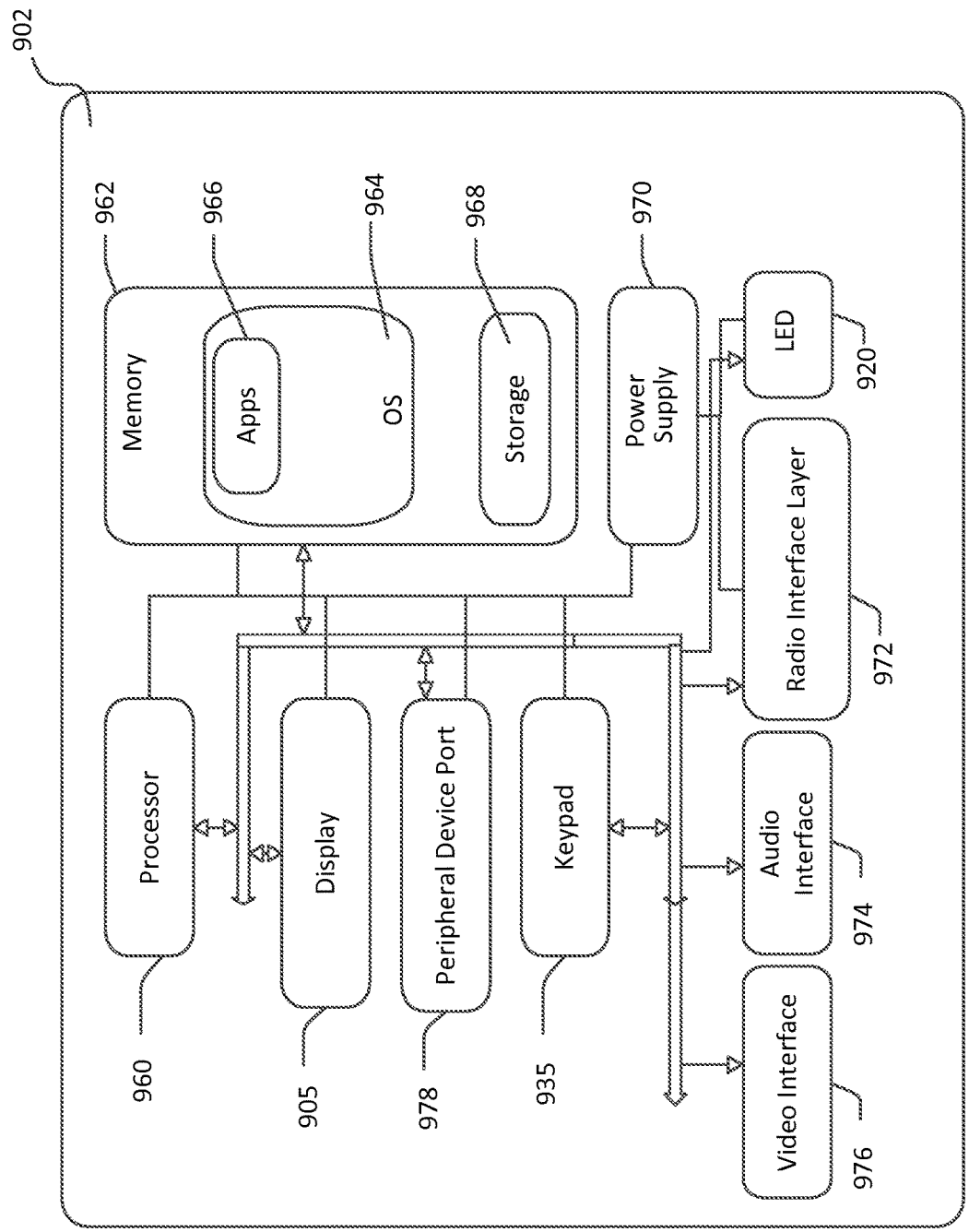
Figure 10:
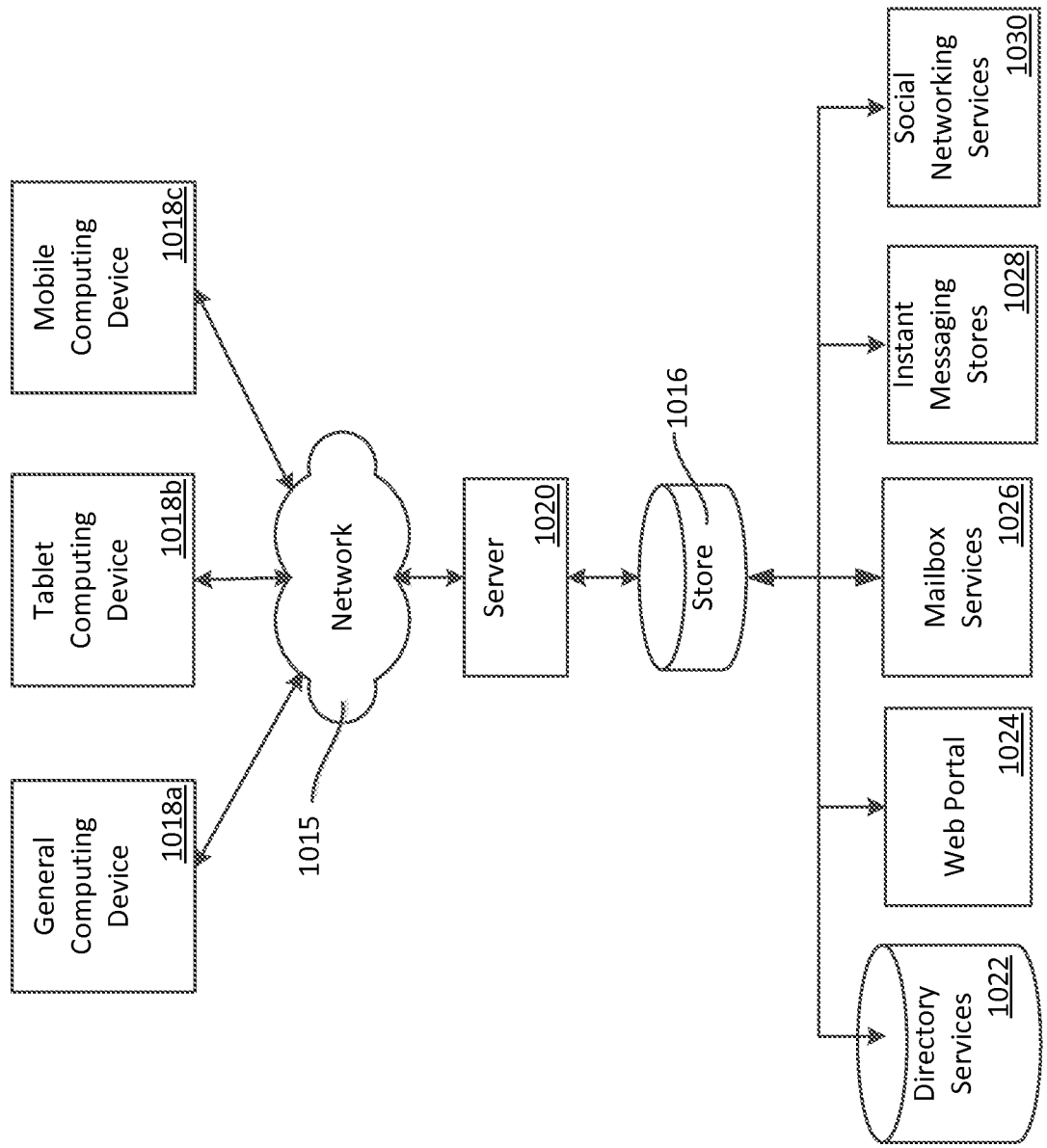
FIG. 10 illustrates one example of the architecture of a system for providing an application that infers user traits.

FIGS. 8-10 and the associated descriptions provide a discussion of a variety of operating environments in which examples of the invention may be practiced. However, the devices and systems illustrated and discussed with respect to FIGS. 8-10 are for purposes of example and illustration and are not limiting of a vast number of computing device configurations that may be utilized for practicing examples of the invention, described herein.

FIG. 8 is a block diagram illustrating physical components of a computing device 802, for example a component of a system with which examples of the present disclosure may be practiced. The computing device components described below may be suitable for the computing devices described above. In a basic configuration, the computing device 802 may include at least one processing unit 804 and a system memory 806. Depending on the configuration and type of computing device, the system memory 806 may comprise, but is not limited to, volatile storage (e.g., random access memory), non-volatile storage (e.g., read-only memory), flash memory, or any combination of such memories. The system memory 806 may include an operating system 807 and one or more program modules 808 suitable for running software applications 820 such as application 828, IO manager 824, and other utility 826. As examples, system memory 806 may store instructions for execution. Other examples of system memory 806 may components such as a knowledge resource or learned program pool, as examples. The operating system 807, for example, may be suitable for controlling the operation of the computing device 802. Furthermore, examples of the invention may be practiced in conjunction with a graphics library, other operating systems, or any other application program and is not limited to any particular application or system. This basic configuration is illustrated in FIG. 8 by those components within a dashed line 822. The computing device 802 may have additional features or functionality. For example, the computing device 802 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 806. While executing on the processing unit 804, the program modules 808 (e.g., application 828, Input/Output (I/O) manager 824, and other utility 826) may perform processes including, but not limited to, one or more of the stages of the operational method 500, 600, and 700 illustrated in FIGS. 5, 6, and 7. Other program modules that may be used in accordance with examples of the present invention may include electronic mail and contacts applications, word processing applications, spreadsheet applications, database applications, slide presentation applications, input recognition applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 802 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 802 may also have one or more input device(s) 812 such as a keyboard, a mouse, a pen, a sound input device, a device for voice input/recognition, a touch input device, etc. The output device(s) 814 such as a display, speakers, a printer, etc. may also be included. The aforementioned devices are examples and others may be used. The computing device 804 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 806, the removable storage device 809, and the non-removable storage device 810 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 802. Any such computer storage media may be part of the computing device 802. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a personal data assistant, a tablet personal computer, a laptop computer, and the like, with which examples of the invention may be practiced. For example, mobile computing device 900 may be implemented as system 100, components of systems 100 may be configured to execute processing methods as described in FIGS. 5, 6, and/or 7, among other examples. With reference to FIG. 9A, one example of a mobile computing device 900 for implementing the examples is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative examples, mobile computing device 900 may incorporate more or less input elements. For example, the display 905 may not be a touch screen in some examples. In yet another alternative example, the mobile computing device 900 is a portable phone system, such as a cellular phone. The mobile computing device 900 may also include an optional keypad 935. Optional keypad 935 may be a physical keypad or a "soft" keypad generated on the touch screen display. In various examples, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 can incorporate a system (i.e., an architecture) 902 to implement some examples. In examples, the system 902 is implemented as a "smart phone" capable of running one or more applications (e.g., browser, e-mail, input processing, calendaring, contact managers, messaging clients, games, and media clients/players). In some examples, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including application 828, IO manager 824, and other utility 826 described herein.

The system 902 has a power supply 970, which may be implemented as one or more batteries. The power supply 970 might further include an external power source, such as an AC adapter or a powered docking cradle that supplements or recharges the batteries.

The system 902 may include peripheral device port 978 that performs the function of facilitating connectivity between system 902 and one or more peripheral devices. Transmissions to and from the peripheral device port 972 are conducted under control of the operating system 964. In other words, communications received by the peripheral device port 978 may be disseminated to the application programs 966 via the operating system 964, and vice versa.

The system 902 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with examples of the present invention, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates one example of the architecture of a system for providing an application that infers user traits, as described above. Target data accessed, interacted with, or edited in association with application 828, IO manager 824, other utility 826, and storage may be stored in different communication channels or other storage types. For example, various documents may be stored using a directory service 1022, a web portal 1024, a mailbox service 1026, an instant messaging store 1028, or a social networking site 1030, application 828, IO manager 824, other utility 826, and storage systems may use any of these types of systems or the like for enabling data utilization, as described herein. A server 1020 may provide storage system for use by a client operating on general computing device 802 and mobile device(s) 900 through network 1015. By way of example, network 1015 may comprise the Internet or any other type of local or wide area network, and client nodes may be implemented as a computing device 802 embodied in a personal computer, a tablet computing device, and/or by a mobile computing device 900 (e.g., a smart phone). Any of these examples of the client computing device 802 or 900 may obtain content from the store 1016.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

While the specific examples of traits and trait information have been discussed, it will be appreciated that the technology disclosed herein is not so limited. Other traits other than the ones mentioned may also be potentially used. A user may elect to adopt out of inferring any or all of these traits.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed:

1. A computing system comprising at least one processor operatively coupled to at least one computer storage device, the device storing instructions that, when executed, are capable of performing a method comprising:
receiving from a user, based on interaction with a digital assistant, a query with one or more words that are included within an inference field of a trait, the trait being characterized by a set of inference fields;
responsive to the query, generating an indirect question associated with the trait, wherein the indirect question is directed to an inference field that is not populated within the set of inference fields of the trait;
providing the indirect question to the user;
receiving a response to the indirect question;
based on the response to the indirect question, assigning a confidence score to the trait;
assigning the trait to the user in accordance with determining that the confidence score is above a predetermined threshold; and
automatically personalizing the user interface of the computing device based on the assignment of the trait, wherein the personalized user interface includes content that relates to the trait.

2. The computing system of claim 1, wherein the method further comprises:
comparing the score with a predetermined threshold;
determining that the trait is likely when the score is greater than the predetermined threshold;
populating the trait with trait information based on the at least one inference field that corresponds to the response; and
providing the personalized user interface.

3. The computing system of claim 2, wherein the populating the trait with the trait information occurs by populating a user profile with the trait information.

4. The computing system of claim 1, wherein the determination of the trait being likely is done using a Bayesian model.

5. The computing system of claim 1, further comprising:
receiving a trigger preceding generating the indirect question, wherein the trigger is at least one of: a query with at least one word that is included within the at least one inference field of the trait, and
interaction with a digital assistant; and
when the at least one inference field of the trait is without information, generating the indirect question.

6. The computing system of claim 1, wherein the generating the indirect question comprises selecting the indirect question from a predetermined list in a database.

7. The computing system of claim 1, wherein the received response is received through one of: a gesture input, text input, or voice input, and wherein the personalized the user interface includes one or more of:
a shortcut to quickly access information relating to the trait,
a response separating information correlating to the trait,
a media application providing information correlating to the trait,
a home page of a web browser based on the trait, and
a background of the user interface based on the trait.

8. A computer implemented method of personalizing a user interface of a computing device based on a trait of an operator, the method comprising:
receiving from a user, based on interaction with a digital assistant, a query with one or more words that are included within an inference field of a trait, the trait being characterized by a set of inference fields;
responsive to the query, generating an indirect question associated with the trait, wherein the indirect question is directed to an inference field that is not populated within the set of inference fields of the trait;
providing the indirect question to the user;
receiving a response to the indirect question;
based on the response to the indirect question, assigning a confidence score to the trait;
assigning the trait to the user in accordance with determining that the confidence score is above a predetermined threshold; and
automatically personalizing the user interface of the computing device based on the assignment of the trait, wherein the personalized user interface includes content that relates to the trait.

9. The method of claim 8 further comprising:
comparing the score with a predetermined threshold;
determining that the trait is likely when the score is greater than the predetermined threshold;
populating the trait with trait information based on the at least one inference field that corresponds to the response; and
providing the personalized user interface.

10. The method of claim 9, wherein the populating the trait with the trait information occurs by populating a user profile with the trait information.

11. The method of claim 8, wherein the determination of the trait being likely is done using a Bayesian model.

12. The method of claim 8, further comprising receiving a trigger preceding generating the indirect question, wherein the trigger is at least one of:
a query with words that relate to the at least one inference field of the trait, and
interaction with a digital assistant.

13. The method of claim 8, wherein the generating the indirect question comprises selecting the indirect question from a predetermined list in a database.

14. The method of claim 8, wherein the received response is received through a gesture input, and wherein the personalized the user interface one or more of:
a shortcut to quickly access information relating to the trait,
a response separating information correlating to the trait,
a media application providing information correlating to the trait,
a home page of a web browser based on the trait, and
a background of the user interface based on the trait.

15. A computer storage device storing instructions that, when executed, perform a method, the method comprising:
receiving from a user, based on interaction with a digital assistant, a query with one or more words that are included within an inference field of a trait, the trait being characterized by a set of inference fields;
responsive to the query, generating an indirect question associated with the trait, wherein the indirect question is directed to an inference field that is not populated within the set of inference fields of the trait;
providing the indirect question to the user;
receiving a response to the indirect question;

based on the response to the indirect question, assigning a confidence score to the trait;

assigning the trait to the user in accordance with determining that the confidence score is above a predetermined threshold; and automatically personalizing the user interface of on the computing device based on the assignment of the trait, wherein the personalized user interface includes content that relates to the trait.

16. The computer storage device of claim 15, wherein the method further comprises:

comparing the score with a predetermined threshold;

determining that the trait is likely when the score is greater than the predetermined threshold;

populating the trait with trait information based on the at least one inference field that corresponds to the response; and providing the personalized user interface.

17. The computer storage device of claim 16, wherein populating the trait with the trait information occurs by populating a user profile with the trait information.

18. The computer storage device of claim 15, wherein the determination of the trait being likely is done using a Bayesian model.

19. The computer storage device of claim 15, wherein the method further comprises receiving a trigger prior to generating the indirect question, and wherein the trigger is at least one of:

a query with words that relate to the at least one inference field of the trait, and interaction with a digital assistant.

20. The computer storage device of claim 15, wherein the generating the indirect question comprises selecting the indirect question from a predetermined list in a database.

* * * * *